DOUGLAS D. DOONAN
INVENTOR.
BY Charles C. Krawczyk
ATTORNEY

DOUGLAS D. DOONAN
INVENTOR.

BY Charles C. Krawczyk

ATTORNEY

United States Patent Office 3,437,817
Patented Apr. 8, 1969

3,437,817

GAIN CONTROL CIRCUIT FOR PHOTOMULTIPLIER TUBES WITH A SEMI-CONDUCTOR DEVICE CONNECTED ACROSS THE LAST RESISTOR OF THE DIVIDER

Douglas D. Doonan, Irondequoit, N.Y., assignor to Bausch & Lomb Incorporated, Rochester, N.Y., a corporation of New York Filed Apr. 25, 1966, Ser. No. 544,869
Int. Cl. H01j 39/12
U.S. Cl. 250—207 6 Claims

ABSTRACT OF THE DISCLOSURE

A photomultiplier gain control circuit wherein a semiconductor device is connected across a portion of a voltage divider connected between the dynode adjacent the anode and the next dynode. A gain control signal is applied to the semi-conductor device to control the voltage developed across the connected portion of the voltage divider and thereby controls the gain of the photomultiplier tube.

This invention relates to gain control circuits in general and more particularly to gain control circuits for photomultiplier tubes and the like.

Photomultiplier tubes generally exhibit high gain and sensitivity characteristics that make them particularly adapted for use as radiation sensitive detectors in photometric type apparatus such as colorimeters, spectrophotometers, etc. The photomultiplier tube functions to generate electrical signals related to the intensity of radiation applied thereto and provides an indication of the radiation transmission, absorption, reflection, color, etc. characteristics of test samples being observed.

In the case of spectrophotometric type apparatus, a monochromator type device is generally employed to provide a beam of variable monochromatic radiation (essentially a limited band of wavelengths) for subjecting test samples to various discrete wavelengths or a spectrum of wavelengths. As the available range of wavelengths is changed, or scanned, the intensity of the source of radiation, the transmission efficiency of the monochromatic device, and the transmission and reflection properties of the optical elements, all vary considerably subjecting the test sample to a wide range of intensity levels. In addition to the foregoing, the response of the photomultiplier tube changes substantially with changes in the wavelength and also with small changes in power supply voltage. In order to compensate for the wide range of testing intensities and changes in system sensitivity, alternate sample and reference radiation pulses are generally applied to the photomultiplier tube. The amplitude of the signals generated by the photomultiplier tube in response to the reference pulses are processed by a gain control circuit to stabilize the gain or sensitivity of the apparatus.

In the past, the amplitude of the signal generated by the photomultiplier tube (in response to a reference pulse of radiation) was sensed and applied to a controllable photomultiplier tube power supply circuit to change the gain of the tube in a manner to compensate for changes in system gain. This was generally accomplished by connecting a high voltage vacuum tube in series with the power supply circuit and control the current conduction therethrough.

In the case of transistorized systems, inverter circuits are generally employed to convert a low direct current potential to power the transistors to a high direct current potential to energize the photomultiplier tube. The voltage applied to the photomultiplier tube can be generally controlled, to some extent, by controlling the input potential applied to the inverter circuit and, therefore, the magnitude of its output potential. Unfortunately, if the inverter circuit output potential is to be controlled over a wide range to compensate for the expected changes in system gain, a drastic change in the inverter circuit input potential may stop the oscillation in the circuit, or worse, may not be sufficient to drive the transistors into saturation, in either case resulting in system failure.

It is therefore, an object to provide a new and improved gain control circuit for photomultiplier tubes and the like.

It is still a further object of this invention to provide a new and improved semiconductor gain control circuit for photomultiplier tubes adapted to control the gain of the photomultiplier tube over a wide range.

It is also an object of this invention to provide a semiconductor gain control circuit adapted to control the gain of a photomultiplier tube over a wide range of testing conditions experienced in spectrophotometric type apparatus to provide a substantially constant system gain.

In the gain control circuit including the invention, a source of energizing potential is coupled between the photocathode and the anode of a photomultiplier tube and includes a voltage divider coupled to the plurality of photomultiplier dynodes. A semiconductor amplifying device is coupled across a portion of the voltage divider in a manner so that a gain control voltage applied to the control electrode of the semiconductor device controls the relative potential between at least two dynodes thereby controlling the gain of the photomultiplier tube.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
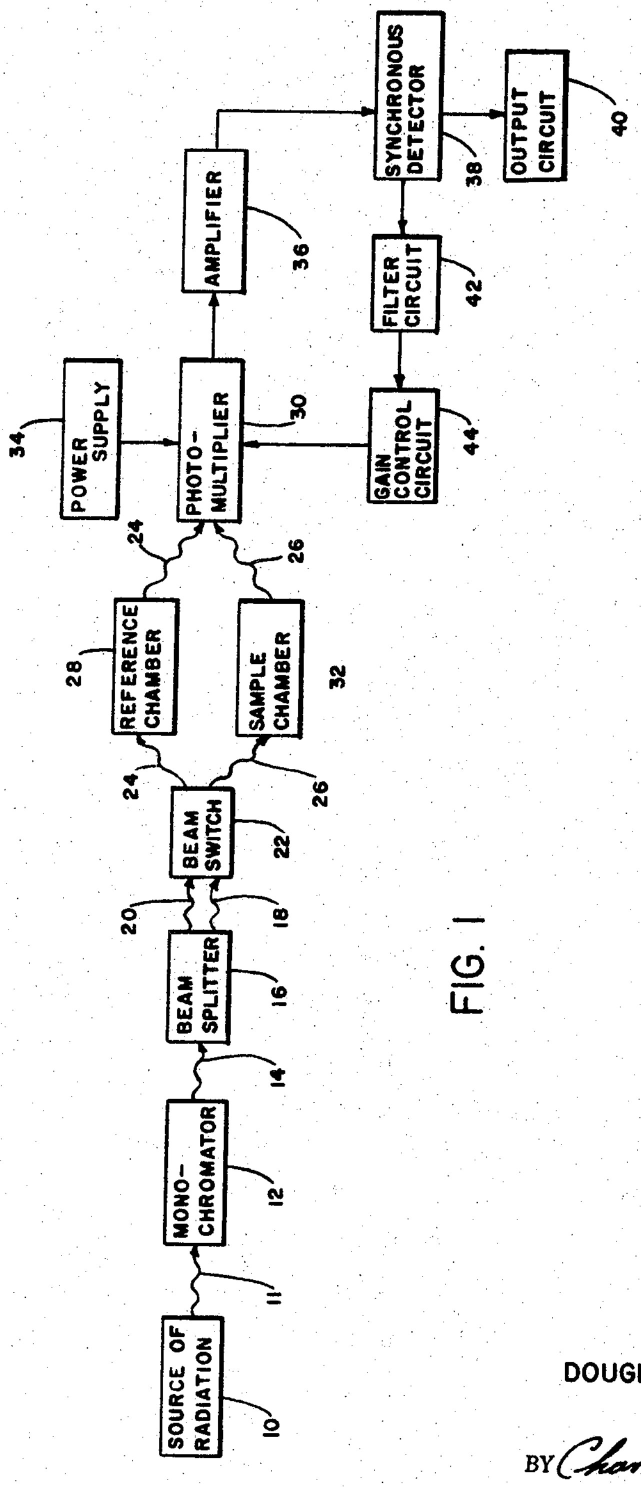
FIGURE 1 is a block diagram of a dual beam spectrophotometer embodying a gain control system including the invention.

Referring to FIGURE 1, a source of radiation 10 casts a beam of radiation 11 into a monochromator device 12 wherein the spectrum of the radiation is dispersed to provide a beam of monochromatic radiation 14 (effectively a limited band of wavelengths) over a wide range of wavelengths. The beam of monochromatic radiation 14 falls on a conventional beam splitter 16, such as a stack of interleaved mirrors, that splits the beam into sample and reference beams of radiation 18 and 20 respectively. The sample and reference beams of radiation 18 and 20 are applied to a conventional radiation beam-switch 22, such as a pair of motor driven rotating discs having openings therein, to provide the alternately chopped reference and sample beams of radiation 24 and 26 respectively.

The chopped reference beam 24 passes through a reference compartment 28 (including a reference sample) and is applied to a photomultiplier tube 30. The chopped sample beam 26 passes through a sample compartment 32 (including a test sample) and is applied to the photomultiplier tube 30. The photomultiplier tube 30, energized by the power supply circuit 34, generates alternate reference and sample electrical signals or pulses, the magnitude of which is a function of the intensity and wavelength of the alternate reference and sample beams of radiation received.

The reference and sample electrical pulses are amplified by an amplifier circuit 36 and applied to a conventional synchronous detector circuit 38, to separate and detect the sample and reference electrical signals. The separated sample signals are applied to an output circuit 40 to provide an indication of the radiation transmission, absorption, etc. characteristics of the test sample (in the sample compartment 32) with respect to the reference sample (in the reference compartment 28). The reference signals are rectified and are applied through a filter circuit 42 as a gain control feedback voltage to a photomultiplier gain control circuit 44.

Figure 2:
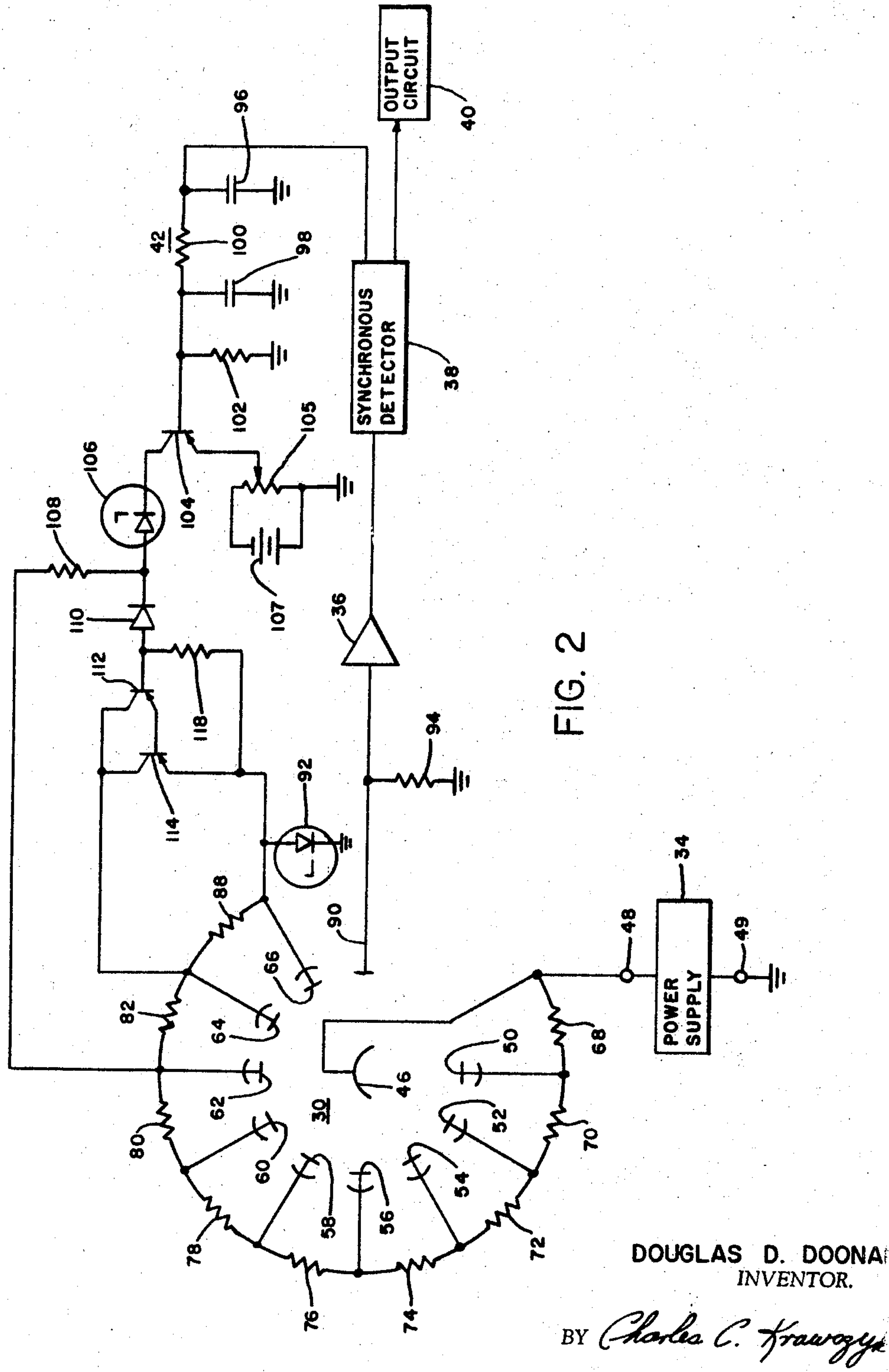
FIGURE 2 is an electrical schematic diagram of a portion of the spectrophotometer of FIGURE 2.

Referring now to FIGURE 2, the photomultiplier tube 30 is connected to generate electrical signals in response to the reference and sample beams 24 and 26 impinging on a radiation sensitive photo cathode 46. The photocathode 46 is directly connected to a high voltage output terminal 48 of a conventional power supply 34, such as a transistor inverter circuit, while the plurality of photomultiplier dynodes 50–66 are connected to consecutive portions of a resistance voltage divider 68–88, also connected to the power supply output terminal 48. The other power supply output terminal 49 is connected to a point of reference potential such as ground. The dynode 66, located adjacent to the photomultiplier tube anode 90, is connected to ground through a Zener diode 92. For purposes of illustration, the dynode 66 will be considered the ninth dynode, while the dynode 64, adjacent the ninth dynode 66 will be considered the eighth dynode, etc.

The photomultiplier tube anode 90 is coupled to ground through a resistor 94 and also to the amplifier circuit 36. The amplifier circuit 36 amplifies the signals generated across the resistor 94 and applies them to the conventional synchronous detector circuit 38. The synchronous detector circuit, may for example, include a plurality of mechanical or electrical chopper circuits connected in a synchronous manner as illustrated in a United States Patent No. 3,234,408, issued to H. G. Camnitz, and assigned to the assignee of the present application. The detected reference signals are applied to the filter circuit 42 which in the present embodiment includes the parallel capacitors 96 and 98 and the series resistor 100, connected as a low pass filter. A direct current gain control potential, directly related to the amplitude of the reference signals, is developed across a resistor 102 and applied to the base electrode of a transistor 104.

The collector and emitter electrodes of the transistor 104 are connected in series with a Zener diode 106, a resistor 108 and a potentiometer 105, between the photomultiplier tube dynode 62 and ground. A source of biasing potential 107 (illustrated as a battery) is connected across the potentiometer 105 to provide a variable bias source for the transistor 104. The junction of the resistor 108 and the Zener diode 106 is connected through a reverse voltage protective diode 110, to the base electrode of a transistor 112. The transistor 112, and the transistor 114, are connected in a compound connection between the dynodes 64 and 66, with the collector of both transistors connected to the eighth dynode 64, while the emitter electrode of the transistor 112, is connected to the base electrode of the transistor 114 and the emitter electrode of the transistor 114 is connected to the ninth dynode 66. A biasing resistor 118, is connected between the base electrode of the transistor 112 and the emitter electrode of the transistor 114. The gain of the photomultiplier tube 30, is varied by controlling the potential difference between the eight and ninth dynodes 64 and 66 (i.e. the voltage drop across the resistor 88). As the potential difference between the dynodes 64 and 66 decreases, the gain of the photomultiplier 30 decreases and vice versa. The voltage drop across the resistor 88 is inversely proportional to the conduction of the shunting transistor 114.

With a preselected bias on the transistor 104 (by presetting the potentiometer 105) the gain control system reaches a steady state condition wherein the reference pulses generated by the photomultiplier tube 30 reach a substantially constant desired level determined by the setting of the potentiometer 105. The synchronous detector 38 functions to provide a direct current gain control signal, the magnitude of which, is related to the amplitude of the reference signals generated by the photomultiplier tube 30. In the embodiment of FIGURE 2, the polarity of the gain control signal generated by the synchronous detector 38 is positive and increases in magnitude as the amplitude of the reference pulses applied thereto increases. Correspondingly, when the amplitude of the reference pulses decreases, the magnitude of the positive gain control signal decreases.

In operation, the filtered gain control signal applied to the base electrode of the transistor 104 is sufficient to overcome the bias on the emitter electrode to provide a controlled current flow through the series circuit including the resistor 108, the Zener diode 106. The current conduction of the transistors 112 and 114 is inversely related to the voltage drop across the resistor 108. When the amplitude of the electrical reference pulses increases, the magnitude of the filtered gain control voltage applied to the base electrode of the transistor 104 increases, which in turn reduces the conduction of the transistor 104 and reduces the voltage drop across the resistor 108. A reduction of the voltage drop across the resistor 108 results in increasing base current in the transistor 112, which in turn increases the conduction of the transistor 114. The increased conduction of the transistor 114 reduces the potential difference between the eighth and ninth dynodes 64 and 66 thereby reduces the gain of the photomultiplier tube 30 (and therefore also reduces amplitude of the reference pulses generated by the photomultiplier tube).

On the other hand, if the amplitude ofthe reference pulses decreases (below the desired value) the magnitude of the positive control voltage generated by the synchronous detector 38 is reduced, increasing the conduction of the transistor 104, which in turn reduces the conduction of the transistor 114, increasing the potential difference between the dynodes 64 and 66 and gain of the photomultiplier tube 30 (and also increases the amplitude of the electrical reference signals). The overall effect of the gain control system is to maintain the amplitude of the reference signal pulses generated by the photomultiplier tube 30 substantially constant for a wide range of testing wavelengths and radiation intensities.

I claim:

1. A gain control circuit for a photomultiplier tube including a photocathode, an anode, and a plurality of dynodes comprising:

first circuit means adapted to apply an energizing potential between said anode and said photocathode including a voltage divider coupled to said plurality of dynodes, and a reference terminal;

a semi-conductor device including first, second and control electrodes;

second circuit means for connecting said first and second electrodes across a portion of said voltage divider connected to the dynodes adjacent said anode and the next dynode;

third circuit means for developing a gain control voltage;

fourth circuit means for maintaining the voltage between said dynode adjacent said anode and said reference terminal substantially constant, and fifth circuit means for applying said gain control voltage to said control electrode so that said semi-conductor device controls the voltage developed across said portion of said voltage divider thereby controlling the gain of said photomultiplier tube.

2. A gain control circuit as defined in claim 1 wherein said semiconductor device comprises a transistor including collector, emitter and base electrodes corresponding to said first, second and control electrodes respectively, and said second circuit means connects said collector and emitter electrodes across at least a portion of the voltage divider connected between the last dynode located adjacent said anode and the second last dynode located adjacent said last dynode.

3. A gain control circuit as defined in claim 2 wherein: said fifth circuit means include circuit means coupling the collector and emitter electrodes of a second transistor in a series circuit between said voltage divider and said reference terminal, circuit means for coupling said series circuit to said base electrode of said first transistor, and circuit means for coupling said fifth circuit means to the base electrode of said second transistor for applying said gain control signal thereto.

4. A gain control system for a photometer including a photomultiplier tube receiving alternate test and reference beams of radiation comprising:

first circuit means adapted to apply an energizing potential between the photocathode and the anode of said photomultiplier tube including a voltage divider coupled to the plurality of dynodes of said photomultiplier tube;

amplifying means coupled to said photomultiplier tube to amplify the electrical signals generated by the photomultiplier tube in response to said received test and reference beams of radiation;

synchronous detection means receiving said amplified electrical signals corresponding to said reference beam of radiation and providing a direct current signal, the magnitude of which is a function of the amplitude of the amplified electrical signal;

a semiconductor device including first, second and control electrodes;

second circuit means connecting the first and second electrodes of said semiconductor to said voltage divider circuit, and third circuit means coupled between said synchronous detection means and said control electrode of said semiconductor device for applying said control signal thereto so that the amplitude of said electrical signal generated by said photomultiplier tube corresponding to said reference beams of radiation remains substantially constant.

5. A gain control system as defined in claim 4:

wherein said first and second control electrodes are connected across at least a portion of the voltage divider connected between a last dynode adjacent said anode and a dynode adjacent said last dynode, and including means for maintaining the voltage on said last dynode substantially constant.

6. A gain control system as defined in claim 5 wherein said third circuit means includes:

a second semiconductor device having its first and second electrodes connected in a series circuit between said voltage divider and said reference point;

circuit means coupling said control electrode of said second semiconductor device to said synchronous detector for controlling the conduction through said device, and circuit means coupling said series circuit to the control electrode of said semiconductor device so that the conduction through said device controls the potential difference between said last dynode and said dynode adjacent said last dynode and, therefore, the gain of said photomultiplier tube.

References Cited

UNITED STATES PATENTS 2,583,143 1/1952 Glick ---------------- 250—207

JAMES W. LAWRENCE, *Primary Examiner.*

V. LAFRANCHI, *Assistant Examiner.*

U.S. Cl. X.R.

330—42